United States Patent [19]
Drake

[11] 3,880,929
[45] Apr. 29, 1975

[54] CATALYTIC HYDROGENATION OF UNSATURATED DINITRILES

[75] Inventor: Charles A. Drake, Bartlesville, Okla.

[73] Assignee: Phillips Petroleum Company, Bartlesville, Okla.

[22] Filed: Nov. 19, 1973

[21] Appl. No.: 416,782

[52] U.S. Cl............................ 260/583 P; 260/583 K
[51] Int. Cl............................................. C07c 87/14
[58] Field of Search...................... 260/583 K, 583 P

[56] References Cited
UNITED STATES PATENTS

| | | | |
|---|---|---|---|
| 2,504,024 | 4/1950 | Howk et al...................... | 260/583 K |
| 3,117,162 | 1/1964 | Rylander et al................. | 260/583 K |
| 3,350,439 | 10/1967 | Feldman et al.................. | 260/465.5 |
| 3,372,195 | 3/1968 | Little............................ | 260/583 K X |
| 3,408,397 | 10/1968 | Feldman et al. ................ | 260/583 K |
| 3,471,563 | 10/1969 | Brake.............................. | 260/583 K |
| 3,488,390 | 1/1970 | Carss et al. ..................... | 260/583 K |

*Primary Examiner*—Joseph Paul Brust

[57] ABSTRACT

The catalytic hydrogenation of an unsaturated dinitrile reactant of the formula

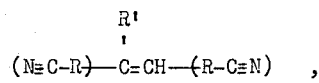

wherein each R is an alkylene or an alkylidene radical, and each R' is an alkyl radical, is carried out in the presence of $NH_3$, hydrogen, methanol, and a catalyst consisting essentially of a first component selected from elemental ruthenium, elemental palladium, ruthenium compounds which are reducible by hydrogen to elemental ruthenium, palladium compounds which are reducible by hydrogen to elemental palladium, and mixtures thereof, and a second component selected from elemental cobalt, elemental nickel, cobalt compounds which are reducible by hydrogen to elemental cobalt, nickel compounds which are reducible by hydrogen to elemental nickel, and mixtures thereof.

18 Claims, No Drawings

CATALYTIC HYDROGENATION OF UNSATURATED DINITRILES

This invention relates to a process for the preparation of saturated aliphatic diamines by the catalytic hydrogenation of unsaturated aliphatic dinitriles.

In general, various processes for the catalytic hydrogenation of unsaturated aliphatic dinitriles to saturated aliphatic diamines are known to the art. Group VIII metal catalysts such as cobalt, nickel, ruthenium, rhodium, or palladium have been employed as effective catalysts for the hydrogenation of various feedstocks in these processes. However, it has been discovered that many of these hydrogenation catalyst materials are not always efficient or effective for the hydrogenation of unsaturated aliphatic dinitriles having the formula

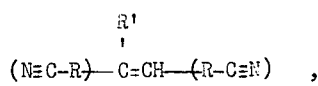

wherein each R is an alkylene or an alkylidene radical, and each R' is an alkyl radical.

In accordance with this invention, these branched-chain unsaturated aliphatic dinitriles can be efficiently reduced to branched-chain saturated aliphatic diamines by the use of a catalyst consisting essentially of a first component selected from the group consisting of elemental ruthenium, elemental palladium, ruthenium or palladium compounds which are reducible by hydrogen to the elemental form, and mixtures thereof, and a second component selected from the group consisting of elemental nickel, elemental cobalt, nickel or cobalt compounds which are reducible by hydrogen to the elemental form, and mixtures thereof, in the presence of ammonia, hydrogen, and methanol.

It is an object of this invention to provide a process for the catalytic hydrogenation of branched-chain unsaturated aliphatic dinitriles to branched-chain saturated aliphatic diamines. Another object is to provide an efficient process for the catalytic hydrogenation of an unsaturated dinitrile having the formula

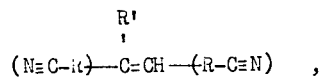

wherein each R is an alkylene or an alkylidene radical, and each R' is an alkyl radical. Still another object is to provide an efficient process for the catalytic hydrogenation of a mixture of branched-chain unsaturated aliphatic dinitriles to produce saturated aliphatic diamines. Still another object is to provide an efficient process for the catalytic hydrogenation of branched-chain unsaturated aliphatic diamines under reaction conditions which limit the occurrence of byproduct-forming reactions. Other objects, aspects and advantages of the invention will be apparent from a study of the specification and the appended claims.

The branched-chain unsaturated aliphatic dinitriles which are advantageously and efficiently hydrogenated in accordance with the process of this invention are the unsaturated dinitriles of the formula:

(I) 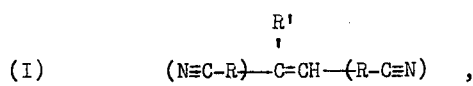

wherein each R is independently selected from the group consisting of an alkylene radical and an alkylidene radical, and R' is an alkyl radical. Each R will generally have from one to fifteen carbon atoms, preferably from one to six, and more preferably from one to three carbon atoms. R' will generally have from one to 15 carbon atoms, preferably from one to six carbon atoms, and more preferably from one to three carbon atoms. In general, the unsaturated dinitrile reactant of formula (I) will contain from seven to 30 carbon atoms, preferably from eight to 16 carbon atoms, and more preferably from nine to 12 carbon atoms.

Representative of unsaturated reactant species of formula (I) include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 1-2-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-3-dodecenedinitrile, 2,4,7,9,11,13 15-heptaethyl-6-hexadecenedinitrile, and mixtures thereof.

If desired, other unsaturated dinitrile reactants can be present and effectively hydrogenated during the hydrogenation of the unsaturated dinitriles of formula (I). Thus, in addition to the unsaturated dinitrile reactants of formula (I), the dinitrile feedstock can contain one or more unsaturated dinitrile reactants of the formula:

(II) 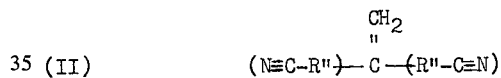

wherein each R" is independently selected from the group consisting of an alkylene radical and an alkylidene radical. In general, each R" will have from one to 15 carbon atoms, preferably from one to seven carbon atoms, and more preferably from one to four carbon atoms. The dinitriles of formula (II) will generally contain from six to 30 carbon atoms, preferably from eight to 16 carbon atoms, and more preferably from nine to 12 carbon atoms. Representative unsaturated dinitrile reactants of formula (II) include such compounds as 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetraproply-6-methylenedodecanedinitrile, 2,26-dimethyl-14-methyleneheptacosanedinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present so long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles. The significant advantages of the invention increase with increasing concentrations of the dinitriles of formula (I) in the feedstock. Thus, the process of the invention is even more advantageous for concentrations of the dinitriles fo formula (I) in the feedstock of at least 5 weight percent. The invention is considered to be particularly advantageous for dinitrile feedstocks having a concentration of the dinitriles of formula (I) of at least 10 weight percent.

A presently preferred branched-chain unsaturated aliphatic dinitrile feedstock for employment in the practice of this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methylene heptanedinitrile. The first four named compounds in this mixture are of the type of formula (I), while the last three named compounds in this mixture are of the type of formula (II). The weight ratio of the dinitriles of formula (I) to the dinitriles of formula (II) in this mixture is generally in the range of about 10:1 to about 1:10.

In the practice of this invention, the catalytic hydrogenation of the unsaturated dinitrile reactant of formula (I) results primarily in the formation of saturated diamine reaction products having the formula:

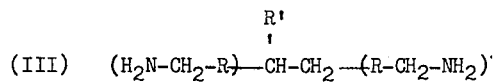

wherein R and R' are as defined hereinbefore. The catalytic hydrogenation of an unsaturated dinitrile reactant of formula (II) results primarily in the formulation of saturated diamine reaction products having the formula:

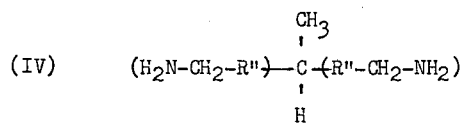

wherein R" is as defined hereinbefore.

The practice of the invention is particularly suited to the catalytic hydrogenation of this mixture of species of formula (I) and formula (II) for the purpose of achieving saturated diamine reaction products which are substantially free of any olefinic unsaturation and preferably essentially free of any olefinic unsaturation. The phrase "substantially free of olefinic unsaturation" signifies that the diamine reaction products contain less than about 1 weight percent unsaturated diamine reaction product based on the total weight of unsaturated and saturated diamine reaction products wherein the weight percents are determined by conventional gas-liquid chromatograph analysis (GLC). The phrase "essentially free of olefinic unsaturation" signifies that the diamine reaction products contain less than about 0.1 weight percent unsaturated reaction product based on the total weight of unsaturated and saturated diamine reaction products wherein the weight percents are determined by conventional GLC analysis techniques. These diamine reaction products which are at least substantially free, and preferably essentially free, of olefinic unsaturation are advantageously employed in the preparation of linear terephthalamide polymers.

One of the most important advantages of the catalytic hydrogenation process of this invention is directly related to the production of a mixture of diamines which are essentially free of olefinic unsaturation from the unsaturated dinitrile product mixture produced by the reaction of acrylonitrile and isobutylene. This advantage is significant since prior art catalytic hydrogenation of the acrylonitrile and isobutylene reaction product mixture failed to substantially or completely reduce the olefinic unsaturation of the unsaturated dinitrile feedstock, thereby producing a reaction product mixture containing branched-chain aliphatic diamines having substantial olefinic unsaturation in the carbon skeleton. The separation of the branched-chain olefinically unsaturated diamines from the saturated diamines is inconvenient, and polyamides prepared from the mixtures containing a significant amount of unsaturated diamines have been found to be unsuited or undesirable in the preparation of polyamide fibers, particularly the terephthalamide polymers. Thus, the catalytic hydrogenation of this invention is a significant advance in the preparation of such polyamides.

Materials that are considered to be suitable for employment as the first catalyst component in the catalytic hydrogenation process of this invention include finely divided elemental ruthenium, elemental palladium, compounds of ruthenium or palladium which are reducible by hydrogen to finely divided elemental ruthenium or palladium, and mixtures thereof. Suitable reducible compounds include the oxides, halides, nitrates, sulfates, oxalates, acetates, carbamates, propionates, tartrates, hydroxides, and the like and mixtures thereof. Specific examples include elemental ruthenium, ruthenium oxide, ruthenium chloride, ruthenium nitrate, ruthenium acetate, ruthenium carbonate, ruthenium hydroxide, elemental palladium, palladium oxide, palladium chloride, palladium nitrate, palladium oxalate, palladium acetate, and palladium hydroxide, and the like. Catalyst mixtures comprising ruthenium and palladium can be employed in any weight ratio of ruthenium to palladium without deleteriously affecting the catalytic hydrogenation benefits associated with the practice of this invention.

Materials that are considered to be suitable for employment as the second catalyst component include finely divided elemental nickel, elemental cobalt, compounds of nickel or cobalt which are reducible by hydrogen to finely divided elemental nickel or cobalt, and mixtures thereof. Suitable reducible compounds include the oxides, halides, nitrates, sulfates, oxalates, acetates, carbamates, propionates, tartrates, hydroxides, and the like, and mixtures thereof. Specific examples include Raney nickel, elemental nickel, nickel oxide, nickel chloride, nickel nitrate, nickel acetate, nickel carbonate, nickel hydroxide, Raney cobalt, elemental cobalt, cobalt oxide, cobalt chloride, cobalt nitrate, cobalt oxalate, cobalt acetate, and cobalt hydroxide, and the like. Catalyst mixtures comprising nickel and cobalt can be employed in any weight ratio of nickel to cobalt without deleteriously affecting the catalytic hydrogenation benefits associated with the practice of this invention.

The weight ratio of the total metal of the first component (ruthenium and/or palladium) to the total metal of the second component (nickel and/or cobalt) will generally be in the range of about 0.01:1 to about 1:1, and preferably will be in the range of about 0.02:1 to about 0.2:1. The weight ratio of catalyst to unsaturated dinitrile reactant, based on the weight of the total of first and second component metals contained therein, can be varied as desired. For the purpose of maintaining reasonable reaction rates under economically attractive catalytic reaction kinetics, it is generally preferred that the weight ratio of the total of first and second component metals to the unsaturated dinitrile reactants be maintained within a range of about 0.01:100 to about 30:100, and preferably in the range of about 0.1:100 to about 20:100.

In the practice of this invention, it is often desirable to employ catalytic amounts of elemental ruthenium, elemental palladium, elemental nickel, elemental cobalt, reducible compounds of ruthenium, palladium, cobalt or nickel, or mixtures thereof supported by a solid catalyst carrier which does not deleteriously affect the catalytic hydrogenation process of this invention. Such supports include, for example, carbon, kieselguhr, silica, alumina, silica-alumina, calcium carbonate, barium carbonate, asbestos, pumice, clays, and the like, and mixtures thereof. The ruthenium, palladium, nickel and/or cobalt can be added to the catalyst support by any of the methods well known in the art. For example, the supported catalysts can be prepared by dry mixing the components or by impregnating the support with a solution or dispersion of ruthenium, palladium, nickel and/or cobalt in elemental form or in the form of reducible compounds thereof. The supported catalyst can be pretreated with hydrogen to reduce the compounds, or such reduction can be achieved in the hydrogenation reactor. When a support is employed, the total of the elemental ruthenium, palladium, nickel and cobalt content will generally be in the range of about 0.5 to about 50 weight percent, preferably in the range of about 1 to about 10 weight percent, based on the weight of the total catalyst components. Presently preferred first components include ruthenium on alumina or palladium on alumina, each having a metal content of about 5 percent by weight, based on the total weight of the catalyst and the support material. Presently preferred second components are Raney nickel and Raney cobalt. These presently preferred catalytic forms, as well as other suitable catalysts such as 10 weight percent palladium on charcoal, ruthenium dioxide, and 5 weight percent ruthenium on charcoal, are available commerically.

The mixed hydrogenation catalysts of this invention can be prepared in any convenient manner. For example, the catalyst components, either supported or unsupported, can be premixed before charging to the hydrogenation reactor or they can be added to the reactor separately in any desired order. They can also be prepared by employing a single support material which is then impregnated with solutions of suitable compounds of palladium, ruthenium, cobalt and/or nickel followed by hydrogen reduction to give the mixed catalyst on a single support material.

Any catalytic hydrogenation temperature can be employed with provides the desired degree of catalytic efficiency in the hydrogenation of the branched-chain unsaturated aliphatic dinitrile containing feedstock. The hydrogenation temperatures will generally be within the range of about 80° C. to about 250° C., preferably within the range of about 100° to about 250° C., and more preferably within the range of about 125° to about 170° C.

The catalytic hydrogenation of branched-chain unsaturated aliphatic dinitriles can be carried out at any hydrogen pressure wherein both the olefinic unsaturation and the nitrile groups are reduced in the presence of ammonia, hydrogen and a suitable diluent. Generally, suitable hydrogen pressures are within the range of from about 500 to about 5,000 pisg, but lower or even higher hydrogen pressures can be employed. Preferably, due to economic considerations, hydrogen pressures within the range of about 1,000 to about 3,000 psig are employed. Higher hydrogen pressures may be desirable at lower reaction temperatures in order to achieve complete reduction within a reasonable reaction time.

Any time interval suited for the catalytic hydrogenation of branched-chain unsaturated aliphatic dinitriles can be employed in the practice of this invention. However, time intervals economically attractive to the process are generally within the range of about 15 minutes to about 5 hours for a batch hydrogenation process. A reaction time in the range of about 1 to about 3 hours is presently preferred in order to insure substantially complete hydrogenation of any unsaturated olefinic bonds in the feedstock as well as complete hydrogenation of the nitrile groups of primary amino groups. The catalytic hydrogenation of unsaturated dinitriles in accordance with the process of this invention can be carried out as a continuous process at any suitable liquid hourly space velocity (LHSV). However, the liquid hourly space velocity rates will generally be within the range of about 0.1 to about 10, more preferably from about 0.5 to about 2, volumes of unsaturated dinitrile reactant plus diluent per volume of catalyst (including the volume of any catalyst support if any is present).

The diluent utilized in the hydrogenation process of the present invention is methanol or a mixture of methanol with other suitable diluents wherein the methanol constitutes at least 25 volume percent, preferably at least 50 volume percent, and more preferably at least 75 volume percent of the diluent mixture. Suitable supplementary diluents include the saturated aliphatic alcohols having two to 12 carbon atoms per molecule, unsubstituted acyclic or unsubstituted cyclic ethers having from four to 12 carbon atoms per molecule and hydrocarbons having four to 12 carbon atoms per molecule, and mixtures thereof. The term "unsubstituted" signifies that there are no substituents other than hydrocarbyl radicals. Examples of supplementary alcohol diluents include ethanol, 2-propanol, 2-methyl-2-propanol, 2-methyl-2-butanol, 2-ethyl-2-hexanol, 2-butanol, 1-hexanol, 1-octanol, 2-decanol, 1-dodecanol, and the like, and mixtures thereof. The foregoing examples of saturated aliphatic alochols are unsubstituted alkanols having from two to 12 carbon atoms per molecule. Examples of ether diluents include diethyl ether, 1,4-dioxane, tetrahydrofuran, and mixtures thereof. Examples of suitable hydrocarbon diluents include n-hexane, n-heptane, 2,2,4-trimethylpentane, cyclohexane, cyclododecane and mixtures thereof. To facilitate handling of the reaction mixtures, the weight ratio of unsaturated dinitrile reactants to diluent charged to the reaction zone is generally within the weight ratio range of about 0.001:100 to about 15:100, and is preferably in the range of about 0.1:100 to about 12:100.

Ammonia is employed in the process of this invention as a means of suppressing undesirable side reactions such as the formation of secondary and tertiary amines. Any amount of ammonia can be employed which is effective in deterring or reducing undesirable side reactions. In general, the mol ratio of ammonia to cyano group (there being two cyano groups in each unsaturated dinitrile) will be in the range of about 1:1 to about 25:1, and preferably will be in the range of about 7:1 to about aabout 15:1.

Recovery of the desired end product, the branched-chain saturated aliphatic diamines, including preferred branched-chain saturated aliphatic diamine reaction products which contain less than about 0.1 percent unsaturated diamine by weight of the total reaction product as determined by GLC, as well as any resulting reaction byproducts, any unconsumed reactants, ammonia, hydrogen, and/or diluents can be carried out by any conventional separation means. In general, at the conclusion of the catalytic hydrogenation process, the reaction zone effluent is cooled and depressurized with the recovery, if desired, of any ammonia or diluent which is vented from the reaction zone effluent during the depressurization operation. The ammonia or diluent can be returned or recycled to the hydrogenation zone if desired. The reaction products can be separated from the catalyst by conventional filtration means. The filtrate containing the at least substantially completely saturated diamines can be conveniently separated from any reaction byproducts or any diluent remaining in the filtrate by any conventional fractional distillation.

The following examples are presented in further illustration of the invention.

EXAMPLE I

A 1 liter autoclave was charged with 40 g (0.247 mol) of the purified reaction product of 2 mols of acrylonitrile with 1 mol of isobutylene. This reaction product consisted essentially of a mixture of isomeric unsaturated dinitriles having one carbon-carbon double bond and 10 carbon atoms per molecule. The principal isomers were 5-methylene-nonanedinitrile and 5-methyl-4-nonenedinitrile with very small amounts of more highly branched isomers such as 2-methyl-4-methylene-octanedinitrile, among others. For simplicity, the above-described reaction product will hereafter be called diadduct. Also charged to the 1 liter autoclave was 350 ml (277 g) of methanol, 2 g of ruthenium dioxide ($RuO_2$), and 10 g of Raney cobalt. The system was flushed with nitrogen and then charged with 100 g (5.87 mol) of ammonia. The reactor was then pressured with hydrogen to 1,250 psig and heated at about 150° C. for 2 hours. The mixture was stirred throughout the reaction period. The reactor was cooled, vented and the contents filtered to remove the catalyst. The filtrate was condensed by removal of excess diluent on a rotary evaporator. Analysis of the residue by GLC analysis indicated complete hydrogenation of the unsaturated dinitriles and a yield of about 80 percent of the saturated diamines.

EXAMPLE II

A one liter autoclave was charged with 350 ml (277 g) of methanol, 20 g (0.123 mol) of diadduct, previously described in Example I, and a mixture of 2 g of palladium on carbon (10% by weight Pd) and 10 g of Raney nickel. The system was flushed with nitrogen then charged with 40 g (2.35 mol) of ammonia. The reaction was then pressured to 1,400 psig with hydrogen and heated at 130° C. for 2 hours with stirring. The reactor was cooled, vented, and the contents filtered. The filtrate was concentrated by removing essentially all of diluent under vacuum. The product was analyzed by gas-liquid chromatography (GLC) which indicated that reduction of the unsaturated dinitrile to the saturated diamine was complete. Fractional distillation of the product yielded 18 g (85 percent yield) of the saturated diamines and only 2.5 g of heavies.

COMPARATIVE EXAMPLE A

As a control run, the one liter autoclave was charged with 350 ml (277 g) of methanol, 5 g of palladium on carbon (5 weight percent palladium, based on total catalyst composition) and 20 g (0.123 mol) of the previously described diadduct. The system was flushed with nitrogen and charged with 40 g (2.35 mol) ammonia, pressured to 1,400 psig with hydrogen and heated to 170° C. for a 2-hour reaction period. The autoclave was then cooled, vented, and the contents filtered. The filtrate was concentrated by evaporating essentially all of the diluent under vacuum. Analysis of the product residue from the concentration step by GLC showed that essentially no diamines were produced and that the major amount of recovered material was unreacted compound (diadduct). This run indicates the surprising reactivity of the catalysts of the invention compared to a control catalyst.

COMPARATIVE EXAMPLE B

In another control run, a one liter autoclave was charged with 350 ml (277 g) of methanol, 30 g (0.185 mol) of diadduct, and 4 g of ruthenium on alumina (5 percent by weight ruthenium) catalyst. The system was flushed with nitrogen, charged with 60 g (3.53 mol) ammonia and heated to about 170° C. for about 2.5 hours. GLC analysis of the product obtained in the usual manner indicated that a considerable amount of carbon-carbon unsaturation remained in the product, i.e., hydrogenation was not complete under these conditions.

COMPARATIVE EXAMPLE C

A one liter autoclave was charged with 2.0 g ruthenium dioxide ($RuO_2$), 40 g (0.247 mol) of diadduct and 350 ml (277 g) methanol. The system was flushed with nitrogen, charged with 100 g (5.87 mol) ammonia, pressured to 1,200 psig with hydrogen and heated to 150° C. for about 2 hours. At the end of the reaction period the product was separated from catalyst and diluent in the manner of Example I. Analysis of the product by GLC indicated the product was comprised of 25 percent unsaturated diamine and 75 percent saturated diamine. This result indicated an incomplete hydrogenation of the unsaturated dinitrile to the saturated diamine under the conditions employed when using a ruthenium catalyst alone.

COMPARATIVE EXAMPLE D

A run employing Raney cobalt was made as a control run. In this run, the one liter autoclave was charged with 300 ml (237 g) methanol, 30 g (0.185 mol) of a diadduct, described, in Example I, and 10 g of the Raney cobalt catalyst. The system was flushed with nitoogen, charged with 60 g (3.53 mol) of ammonia and pressured to 1,500 psig with hydrogen. The reaction mixture was heated from 58° C. to 190° C. in the first hour then maintained at 190° C. for the last 2 hours of the three-hour reaction period. The reactor was cooled, vented, and the contents filtered. The filtrate was analyzed by GLC from which it was estimated that about 50 weight percent of the product was saturated diamines while unsaturated diamines accounted for about 30 weight percent and heavies accounted for 20 weight percent of the product. This run demonstrated that a catalyst of the prior art was not entirely effective under the conditions employed for producing a saturated diamine from the unsaturated dinitrile.

COMPARATIVE EXAMPLE E

In a control run, a 1 liter autoclave was charged with 30 g (0.185 mol) of diadduct, 300 ml (237 g) of methanol and 10 g of Raney nickel. The system was flushed with nitrogen, charged with 60 g (3.53 mol) of ammonia, and pressured to 1,500 psig with hydrogen. The reactor was heated to 190° C. for a reaction period of about 2 hours. GLC analysis of the product obtained from the reaction mixture indicated the product was composed of 65 percent saturated diamines, 10 percent unsaturated diamines and about 20 percent heavies. This result indicates that Raney nickel alone in methanol was not completely effective in hydrogenating unsaturated dinitriles to saturated diamines.

Reasonable variations and modifications are possible within the scope of the foregoing disclosure and the appended claims to the invention.

What is claimed is:

1. A process for the catalytic hydrogenation of an unsaturated dinitrile feedstock containing at least one unsaturated dinitrile compound of the formula:

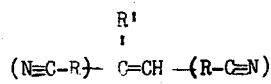

wherein each R is independently selected from the group consisting of an alkylene radical and an alkylidene radical, R' is an alkyl radical, and the number of carbon atoms in said compound is in the range of seven to 30; which comprises contacting under suitable hydrogenation conditions said feedstock with ammonia; hydrogen, a diluent comprising at least 25 volume percent methanol; and the catalyst consisting essentially of a first catalyst component selected from the group consisting of elemental ruthenium, elemental palladium, ruthenium compounds which are reducible by hydrogen to elemental ruthenium at said hydrogenation conditions, palladium compounds which are reducible by hydrogen to elemental palladium at said hydrogenation conditions, and mixtures thereof, and a second catalyst component selected from the group consisting of elemental nickel, elemental cobalt, nickel compounds which are reducible by hydrogen to elemental nickel at said hydrogenation conditions, cobalt compounds which are reducible by hydrogen of elemental cobalt at said hydrogenation conditions, and mixtures thereof; to thereby effect the at least substantially complete hydrogenation of said at least one unsaturated dinitrile compound to the corresponding branched-chain saturated aliphatic diamine; the weight ratio of the total metal of said first catalyst component to the total metal of said second catalyst component being in the range of about 0.01:1 to about 1:1.

2. A process in accordance with claim 1 wherein said hydrogenation conditions comprise a weight ratio of the total of ruthenium and/or palladium, and cobalt and/or nickel present to the unsaturated dinitriles in the range of about 0.01:100 to about 30:100, a mol ratio of ammonia to cyano groups in the range of about 1:1 to about 25:1, a hydrogen pressure in the range of about 500 to about 5000 psig, a weight ratio of the unsaturated dinitriles to the diluent in the range of about 0.001:100 to about 15:100, a temperature in the range of about 80° C to about 250° C, and a reaction time in the range of about 15 minutes to about 5 hours if conducted as a batch process or a liquid hourly space velocity rate in the range of about 0.1 to about 10 if conducted as a continuous process.

3. A process in accordance with claim 1 wherein said catalyst together with a solid catalyst support forms a catalyst composition, the content of the elemental metal in said catalyst composition being in the range of about 0.5 to about 50 weight percent of said catalyst composition.

4. A process in accordance with claim 1 wherein each of said alkylene radical, said alkylidene radical and said alkyl radical has from one to 15 carbon atoms, and wherein said diluent further comprises at least one material selected from the group consisting of unsubstituted alkanols having two to 12 carbon atoms per molecule, unsubstituted acyclic and unsubstituted cyclic ethers having four to 12 carbon atoms per molecule, and hydrocarbons having from four to 12 carbon atoms per molecule.

5. A process in accordance with claim 2, wherein said at least one unsaturated dinitrile compound comprises a mixture of 5-methyl-4-nonenedinitrile, 2,4-dimethyl-4-octenedinitrile, 2,4-dimethyl-3-octenedinitrile, and 2,4,6-trimethyl-3-heptenedinitrile.

6. A process in accordance with claim 1 further comprising recovering a diamine product essentially free of unsaturation.

7. A process in accordance with claim 1 further comprising recovering a diamine product containing less than about 1 weight percent unsaturated diamines.

8. A process in accordance with claim 7 wherein said first catalyst component comprises ruthenium dioxide and said second catalyst component comprises Raney cobalt.

9. A process in accordance with claim 7 wherein said first catalyst component comprises palladium and said second catalyst component comprises Raney nickel.

10. A process in accordance with claim 1, wherein said feedstock further comprises at least one unsaturated dinitrile reactant of the formula:

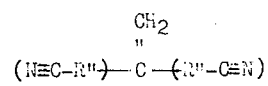

wherein each R'' is independently selected from the group consisting of an alkylene radical and an alkylidene radical, and the number of carbon atoms in said reactant is in the range of six to 30.

11. A process in accordance with claim 10 wherein said hydrogenation conditions comprise a weight ratio of the total of ruthenium and/or palladium, and cobalt and/or nickel present to the unsaturated dinitriles in the range of about 0.1:100 to about 20:100, a mol ratio of ammonia to cyano groups in the range of about 7:1 to about 15:1, a hydrogen pressure in the range of about 1,000 to about 3,000 psig, a weight ratio of the unsaturated dinitriles to the diluent in the range of about 0.1:100 to about 12:100, a temperature in the range of about 100° C to about 250° C, and a reaction time of about 15 minutes to about 5 hours if conducted as a batch process or a liquid hourly space velocity rate in the range of about 0.1 to about 10 if conducted as a continuous process; said at least one unsaturated dinitrile compound constituting at least 5 weight percent of the unsaturated dinitriles in said feedstock; wherein said at least one dinitrile compound is converted primarily to a saturated diamine having the formula:

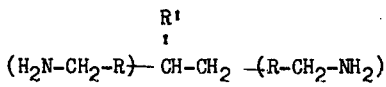

wherein R and R' are as defined hereinabove; wherein said at least one unsaturated dinitrile reactant is converted primarily to a saturated diamine having the formula:

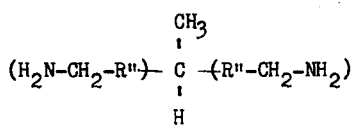

wherein R'' is as defined hereinabove, and further recovering a diamine product containing less than about 1 weight percent unsaturated diamines.

12. A process in accordance with claim 11 wherein said first catalyst component is selected from the group consisting of elemental ruthenium, ruthenium compounds which are reducible by hydrogen to elemental ruthenium at said hydrogenation conditions, and mixtures thereof, and wherein the contacting step is carried out at a temperature in the range of about 100° to about 250° C.

13. A process in accordance with claim 12 wherein said second catalyst component is selected from the group consisting of elemental nickel, nickel compounds which are reducible by hydrogen to elemental nickel at said hydrogenation conditions, and mixtures thereof.

14. A process in accordance with claim 12 wherein said second catalyst component is selected from the group consisting of elemental cobalt, cobalt compounds which are reducible by hydrogen to elemental cobalt at said hydrogenation conditions, and mixtures thereof.

15. A process in accordance with claim 11 wherein said first catalyst component is selected from the group consisting of elemental palladium, palladium compounds which are reducible by hydrogen to elemental palladium at said hydrogenation conditions, and mixtures thereof, and wherein the contacting step is carried out at a temperature in the range of about 100° to about 250° C.

16. A process in accordance with claim 15 wherein said second catalyst component is selected from the group consisting of elemental nickel, nickel compounds which are reducible by hydrogen to elemental nickel at said hydrogenation conditions, and mixtures thereof.

17. A process in accordance with claim 15 wherein said second catalyst component is selected from the group consisting of elemental cobalt, cobalt compounds which are reducible by hydrogen to elemental cobalt at said hydrogenation conditions, and mixtures thereof.

18. A process in accordance with claim 11 wherein said feedstock comprises 5-methylenenonanedinitrile and 5-methyl-4-nonenedinitrile.

* * * * *